United States Patent [19]

Bernstein et al.

[11] Patent Number: 5,133,213
[45] Date of Patent: Jul. 28, 1992

[54] VELOCITY METER FOR SPORTS IMPLEMENTS

[76] Inventors: Jerome D. Bernstein, 317 W. 89th St., New York, N.Y. 10024; Chris Amrhein, 57 W. 73rd St., New York, N.Y. 10023

[21] Appl. No.: 603,014
[22] Filed: Oct. 25, 1990
[51] Int. Cl.$^5$ .............................................. G01P 3/16
[52] U.S. Cl. .................... 73/491; 273/186 A
[58] Field of Search ............... 73/492, 493, 380, 381, 73/491, 514, 535; 273/26 B, 186 A

[56] References Cited

U.S. PATENT DOCUMENTS 4,027,535  6/1977  Swanson .............................. 73/381

Primary Examiner—John E. Chapman
Attorney, Agent, or Firm—Michael Ebert

[57] ABSTRACT

A velocity meter attachable to a baseball bat or other hand-held swingable sports implement to indicate swing velocity. The meter is provided with a ratchet wheel rotatable within a case whose cover has a window exposing a pointer on the upper face of the wheel. Affixed to the under face of the wheel at an eccentric position thereon is an inertia weight. The teeth of the wheel are engaged by a retractable pawl which permits counterclockwise motion of the wheel but prevents clockwise motion except when the pawl is retracted to permit meter resetting.

8 Claims, 3 Drawing Sheets

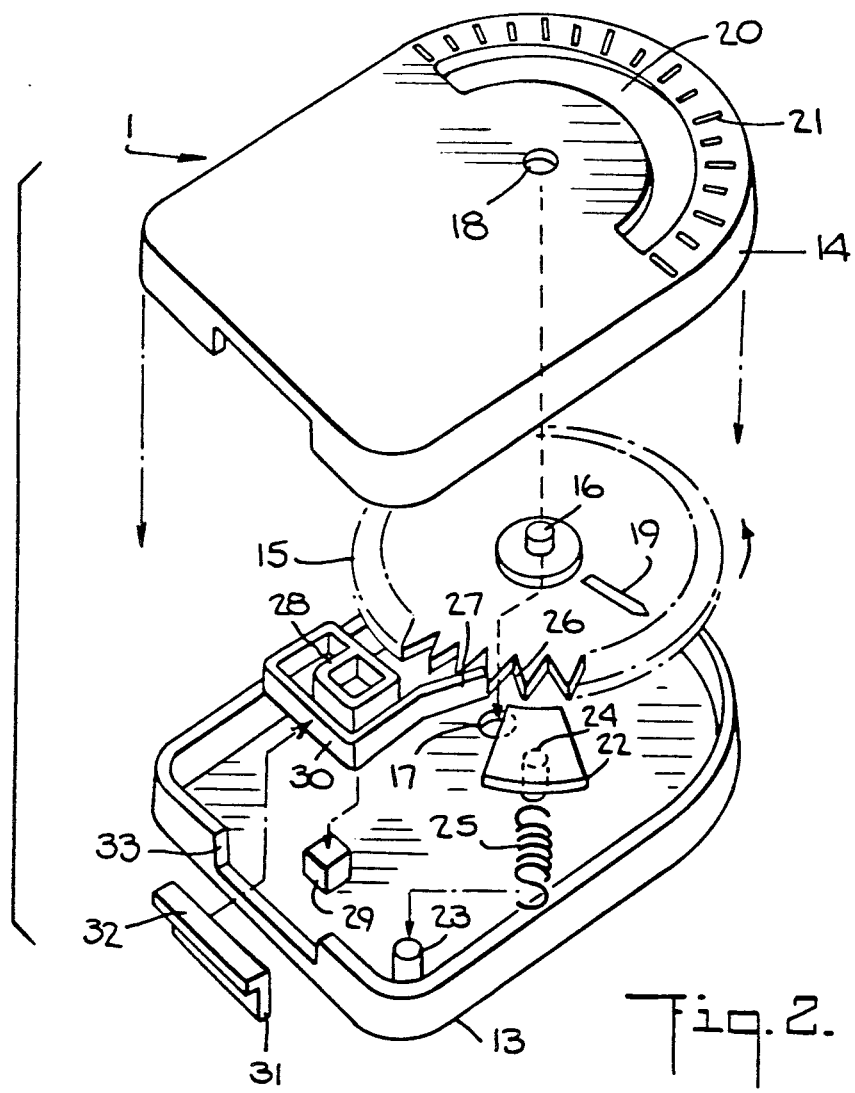

STARTING POSITION

FIRST POSITION

SECOND POSITION

THIRD POSITION

FINAL POSITION

VELOCITY METER FOR SPORTS IMPLEMENTS

BACKGROUND OF INVENTION

1. Field of Invention:

This invention relates generally to velocity meters for hand-held sports implements adapted to strike a play ball, to indicate the speed at which the implement is swung, and more particularly to a self-sufficient velocity meter of this type which is attachable to the implement and is responsive to a centrifugal force developed by the swing.

2. Status of Prior Art:

A velocity meter in accordance with the invention will be described mainly in connection with a baseball bat. However, it is to be understood that the velocity meter is applicable to golf clubs, tennis rackets and other hand-held sports implements adapted to strike a play ball, the meter serving to indicate the swing velocity.

In the game of baseball, a player who grasps a baseball bat in his hands seeks to strike a baseball hurled toward him by a pitcher. Regardless of the speed of the oncoming baseball, it cannot be hit well by the bat unless the ball is squarely met by the bat and the bat is being swung at high velocity.

In coaching a player as to how best to hit a baseball, the coach must take into account not only the placement of the player's feet, the manner in which he holds his arms in preparation for striking an oncoming ball and the way in which his hands grasp the bat, but he must also factor in the velocity at which the bat is swung. Regardless of how carefully the player follows the coach's instructions, unless his swing has a high velocity, the ball will not be hit well. Hence a high swing velocity is of vital importance.

However, the coach is not able, simply by observing the player, to determine the difference between, say, a fifty and a seventy mile per hour swing, and he cannot, therefore, instruct the player as to how best to raise the velocity of his swing. Yet high swing velocity is crucial to effective batting. This is also true, of course, in other games such as golf or tennis in which the player swings a club, a racket or other hand-held implement.

In order to make it possible to indicate, at least in relative terms, the velocity of the swing of a baseball bat, the Lane et al. U.S. Pat. No. 4,267,793 discloses a velocity meter in which housed in a cavity formed in the body of the baseball bat and slidable therein is a spring-loaded plunger. When the bat is swung, the plunger is then advanced to a degree that depends on swing velocity, this advance being indicated.

A similar velocity meter for golf clubs as well as baseball bats is disclosed in the Davis U.S. Pat. No. 3,561,272 in which a weighted indicator is shifted by centrifugal force against spring tension, a pawl and ratchet mechanism acting to retain the advanced position of the indicator. Along similar lines is the speed indicator attachable to a golf club disclosed in the Hetzel U.S. Pat. No.2,543,722. This patent shows a spring-loaded plunger responsive to the centrifugal force produced when the club is swung The Gray U.S. Pat. No. 2,922,633, shows an impact meter having pivoted weight arms which are caused to swing in opposite directions in response to an impact acceleration. The swinging arms are coupled by way of a ratchet wheel to a pointer. The aim of this device is to count the number of individual impacts of a predetermined minimum magnitude received in either direction.

Of greatest prior art interest is the manual thrust gauge shown in the Swanson U.S. Pat. No., 4,027,535. This gauge is strapped to the wrist of a boxer, a participant in karate practice or other individual who engages in combat sports, to determine the force with which a blow is struck. In the Swanson meter, a ratchet wheel having an eccentric inertia weight thereon is engaged by a retractable pawl. Encircling the axle of the ratchet wheel is a helical spring which acts to resist movement of the inertia weight as well as to reset the meter. As the ratchet wheel is caused to turn, the spring wound around its axle produces a progressively increasing tension. Because of this spring arrangement, the meter is relatively insensitive at the lower end of its scale when the swing velocity is low.

As a practical matter, it is important to the player who at the outset of a training program may exhibit fairly low values of swing velocity, that he know what these values are. In this way he can then as training continues, see the early stages of improvement when the velocity values are still in the low end of the range. A meter of the Swanson type is "stiff," for it takes high velocity values to produce a meaningful indication.

SUMMARY OF INVENTION

In view of the foregoing, the main object of this invention is to provide a velocity meter which may be strapped or otherwise attached to a baseball bat or other hand-held sports implement adapted to be swung by a player grasping the implement to strike a play ball, the meter indicating the velocity of the swing.

A meter in accordance with the invention need not be linear and need not be calibrated in terms of miles-per-hour speed, for in training it is not necessary to know the actual speed, but only whether as a result of training there has been an appreciable increase in swing speed.

Thus if at the beginning of a training program, the meter pointer goes about one quarter of a way up the scale with each swing, and then as a result of training, in subsequent swings the pointer goes half way and then three quarters of a way up the scale, this reflects a substantial improvement in swing velocity.

More particularly, an object of the invention is to provide a velocity meter which is highly sensitive, so that it indicates very low and low as well as medium and high swing velocity values.

Also an object of the invention is to provide a velocity meter which is of simple design, yet operates efficiently and reliably, and which can be constructed at relatively low cost.

Yet another object of the invention is to provide a velocity meter that is easily reset.

Briefly stated, these objects are attained in a velocity meter attachable to a baseball bat or other hand-held swingable sports implement to indicate swing velocity. The meter is provided with a ratchet wheel rotatable within a case whose cover has a window exposing a pointer on the upper face of the wheel. Affixed to the under face of the wheel at an eccentric position thereon is an inertia weight. The teeth of the wheel are engaged by a retractable pawl which permits counter-clockwise motion of the wheel but prevents clockwise motion except when the pawl is retracted to permit meter resetting. The wheel rotates within a plane divided into four quadrants whose center is coincident with the wheel center, two quadrants being below the wheel center and two above. Affixed to the under face of the wheel within the lower right quadrant is an inertia weight.

A helical spring joins a point on the weight to a point on the case below the lower right quadrant. At the zero position of the wheel, the spring is aligned with a radial axis extending from the wheel center to the case point, the spring then subjecting the wheel to minimum tension. When the implement is swung, the resultant centrifugal force causes the wheel to turn counterclockwise and in the course of this motion, the weight point travels from the lower right quadrant in which the tension of the spring is low, to the upper right quadrant and then to the upper left quadrant, resulting in stretching the spring to produce an increase in tension. Wheel motion is arrested at a position indicative of the swing velocity.

BRIEF DESCRIPTION OF DRAWINGS

For a better understanding of the invention as well as other objects and further features thereof, reference is made to the following detailed description to be read in conjunction with the accompanying drawings, wherein:

FIG. 1 shows a standard baseball bat having strapped thereto a velocity meter in accordance with the invention to indicate swing velocity;

FIG. 2 is an exploded view of the meter to expose its internal mechanism;

DESCRIPTION OF INVENTION

Figure 3:
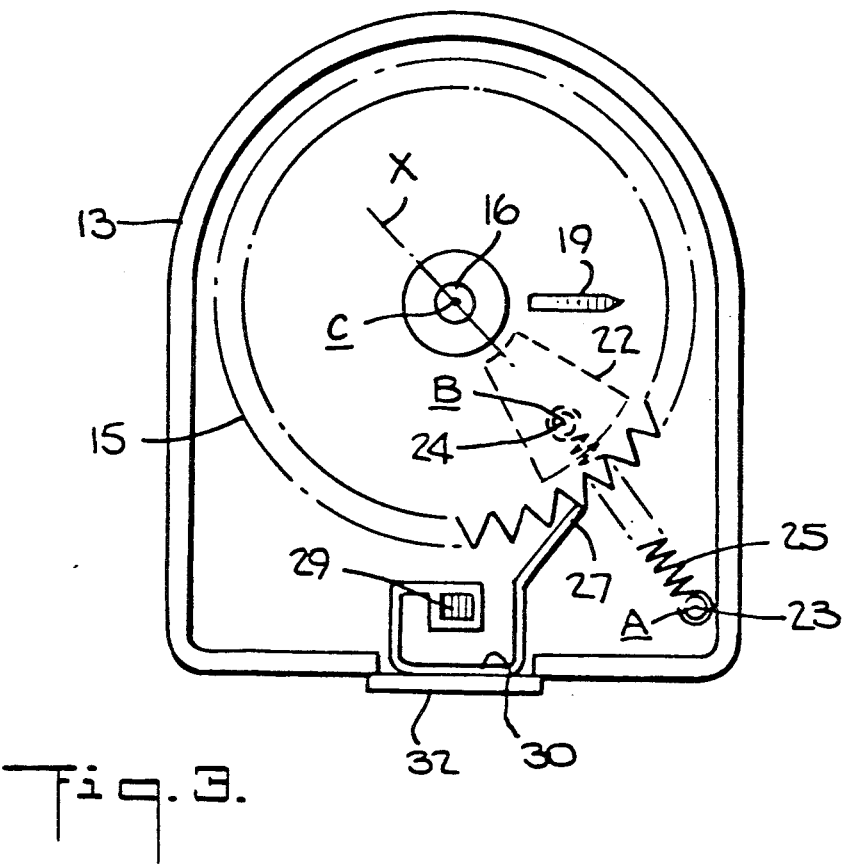
FIG. 3 is a plan view of the meter with the cover removed to show the mechanism as it appears at the start of a swing.

The Basic Structure:

Referring now to FIG. 1, a velocity meter in accordance with the invention, generally designated by numeral 10, is shown attached to a standard baseball bat 12 by means of a strap 11. In practice, the strap which is secured to the case of the meter may be a band of fabric material provided with an adjustable buckle or a Velcro fastener so that the meter may readily be strapped onto the cylindrical body of the bat adjacent its upper end.

As pointed out previously, the velocity meter may be attached to a golf club, a tennis racket or any other hand-held sports implement in order to indicate the speed at which the implement is swung by a player grasping the implement.

As shown in FIG. 2, the velocity meter includes a generally rectangular case 13 having a base and an upstanding wall surrounding the base whose upper section has an arcuate formation. Case 13 is enclosed by a cover 14 having a complementary shape.

Mounted for rotation within case 13 is a ratchet wheel 15 whose axle 16 is journaled at its lower end in a hole 17 formed in the base of the case, the upper end of the axle being received in a hole 18 formed in cover 14 so that the axis of the wheel is normal to the plane of the base and that of the cover. The curvature of the upper section of the case conforms to that of the wheel so that wheel 15 is free to turn within the case.

Affixed to or inscribed on the top face of wheel 15 is a radial pointer 19. This pointer is viewable through an arcuate window 20 in cover 14 and is movable along a scale 21 whose markings are adjacent the upper edge of the window.

Attached at an eccentric position to the under face of wheel 15 adjacent its toothed rim is an inertia weight 22. This weight, which has a generally trapezoidal shape is preferably formed of heavy metal, such as stainless steel. A helical spring 25 is connected at one end by a hook or other means to a pin 23 anchored on the base of case 13 at its lower right corner. The other end of the spring is connected to a pin 24 depending from weight 22.

The peripheral teeth 26 of ratchet wheel 15 are successively engaged by a pawl 27 of flat spring material which extends from a flat section 30 terminating in a square frame 28. Frame 28 is received on a post 29 anchored on the base of case 13. Flat section 30 is parallel to the lower wall section of case 13. Attached to flat section 30 is a release bar 31 having a finger ledge 32 that projects out of a notch 33 in the lower wall section of the case so that the bar may be manually depressed. When the bar is depressed, then, as shown in FIG. 4, pawl 27 is disengaged from the teeth 26 of ratchet wheel 15.

As shown in FIG. 3, at the starting position of the meter mechanism, before the implement to which it is attached is subjected to the centrifugal force produced by swinging the implement, spring 25, which is connected between a point A, represented by pin 23 anchored in case 13 and a point B represented by pin 24 on inertia weight 22 is then aligned with a radial axis X which passes through the center of the wheel.

At this starting position, the distance between points A and B is short, and the spring then exhibits its minimum tension.

Figure 4:
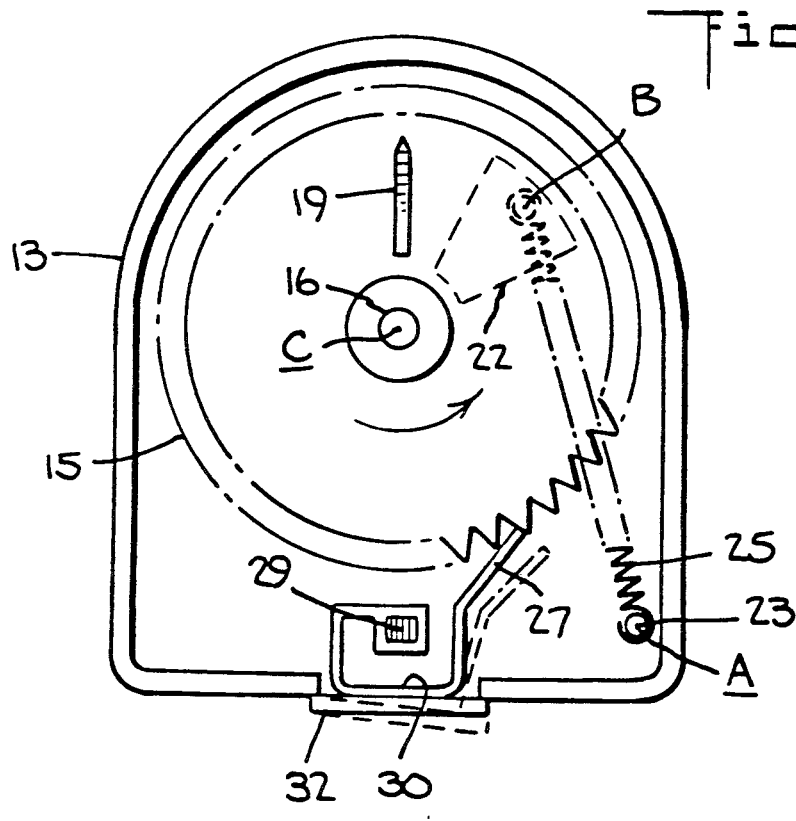
FIG. 4 is the same as FIG. 3, but showing the mechanism at the conclusion of the swing.

When, as shown in FIG. 4 the implement is swung, the resultant centrifugal force to which the inertia weight is then subjected, causes wheel 15 to turn counterclockwise and in doing so to lengthen the distance between points A and B bridged by spring 25, thereby causing spring 25 to stretch. The resultant increase in spring tension seeks to turn wheel 15 clockwise, but such rotation is prevented by pawl 27.

The wheel, whose counterclockwise motion is resisted by the expanded spring is arrested at a final position that depends on the swing velocity. This final position is indicated by pointer 19. In order to reset the meter for the next swing, the release bar 31 is pressed to disengage pawl 27 from the teeth of the wheel, thereby permitting spring 25 to contract to return the wheel to its starting position.

As will be evident in FIG. 2, the meter is very easy to assemble. All that is necessary is to seat the ratchet wheel within the case with the axle 16 going into hole 17, to hook spring 25 between pins 24 and 23, and to seat the pawl frame 28 on post 29, after which one applies the cover so that its hole 18 goes over the upper end of the wheel axle.

Meter Sensitivity:

A significant feature of the wheel and spring assembly of the meter is that it renders the meter highly sensitive to low as well as high levels of swing velocity whereby the meter is not "stiff" and provides meaningful readings throughout the swing velocity scale. The reason for this sensitivity will now be explained in connection with FIGS. 5 to 9 which schematically illustrate the assembly.

Figure 5:
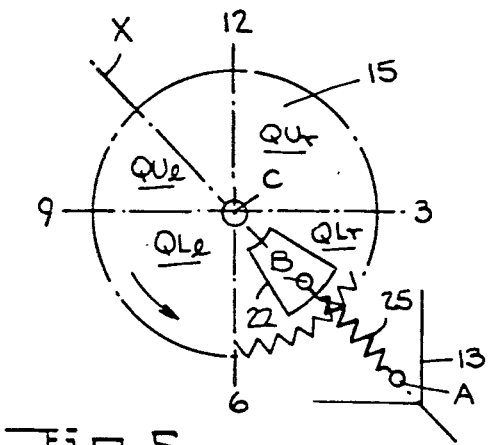
FIG. 5 schematically represents the ratchet wheel and spring assembly as it appears at zero position (5 o'clock) at the start of a swing.

FIG. 5 shows the assembly at the starting position of the wheel. Wheel 15 rotates within a plane that for purposes of explanation is divided into four quadrants whose center is coincident with center C of the wheel. Weight 22 is disposed within the lower right quadrant $QL_r$, the other quadrants being the lower left quadrant $QL_l$, and the upper left and right quadrants $QU_l$ and $QU_r$.

Helical spring 25 joins point B on weight 22 to point A in the lower right corner of case 13, point A being below the lower right quadrant $QL_r$. Spring 25 is then aligned with the radial axis X running from wheel center C through points B and A. In this starting position, the spring affords minimum tension, for it is only lightly stretched.

When the implement to which the velocity meter is attached is swung, the resultant centrifugal force causes wheel 15 to turn counterclockwise against the tension of the spring.

Figure 6:
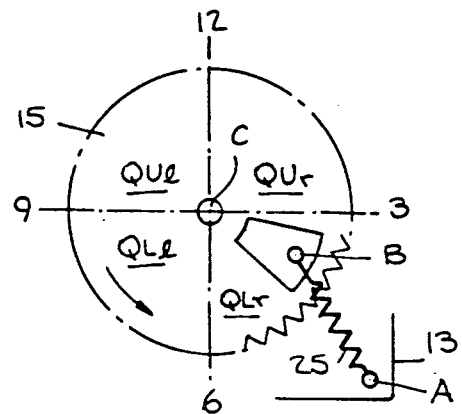
FIG. 6 schematically shows the wheel and spring assembly when in the course of a swing, the wheel turns counterclockwise to approach a 4 o'clock position.

FIG. 5 is provided with 12, 3, 6 and 9 o'clock indicia. Weight point B, at the starting position of the wheel, is at about 5 o'clock. As the wheel proceeds to turn, weight point B first travels counterclockwise toward the 4 o'clock position, as shown in FIG. 6. Because this position is still within lower right quadrant $QL_r$ and the distance between points A and B remain small, no substantial increase in spring tension is produced, and the spring then offers little resistance to wheel movement.

Since movement within lower right quadrant $QL_r$, reflects low levels of swing velocity, the meter is highly sensitive to these levels, and if wheel 15 is arrested while weight point B lies within this quadrant, these levels will be clearly indicated.

Figure 7:
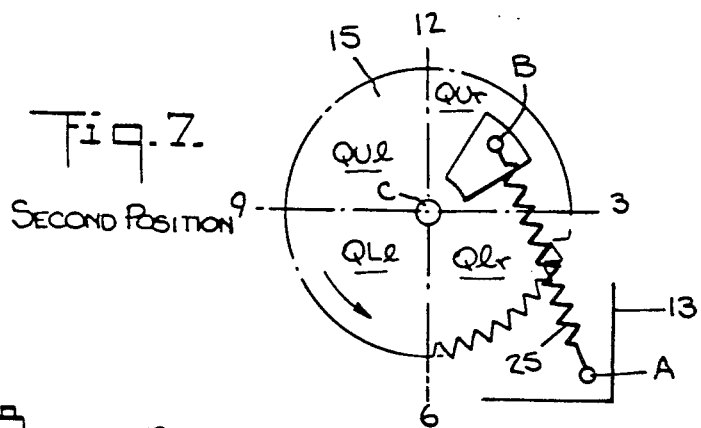
FIG. 7 shows the same assembly approaching the one o'clock position.

But if the swing velocity is somewhat above low level values, weight point B will then travel into upper right quadrant $QU_r$, as shown in FIG. 7. Now the distance between case point A and weight point B is significantly greater than the distance between these points when weight point B lies in the lower right quadrant $QL_r$. As a result, spring 25 is stretched to traverse the increased distance and spring tension is increased to resist wheel motion.

Figure 8:
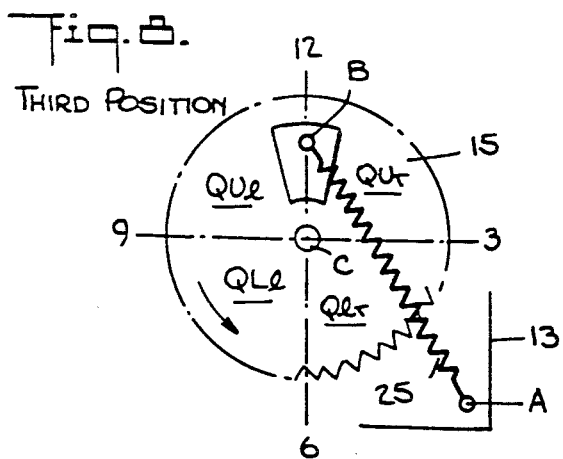
FIG. 8 shows the same assembly at about the 12 o'clock position.

If the swing velocity is at a still higher level and the wheel is not arrested when weight point B lies in the upper right quadrant $QU_r$, but travels to the third position shown in FIG. 8 where point B is at the junction of quadrants $QU_R$ and $QU_l$, then the distance between points A and B is further increased, with a resultant further rise in spring tension.

Figure 9:
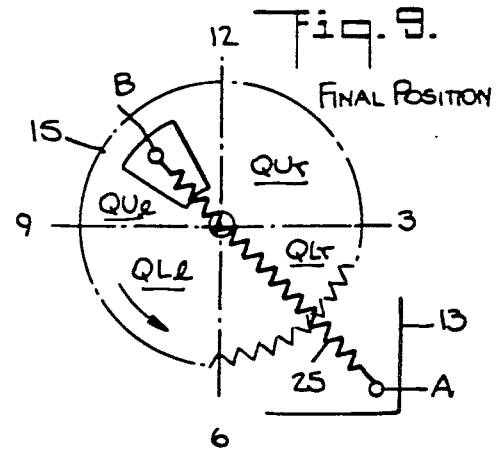
FIG. 9 shows the same assembly at about the 11 o'clock position.

If the swing velocity is very high, then as shown by the final position in FIG. 9, weight point B will lie within the upper left quadrant $QU_l$, and the wheel will be arrested in this quadrant to indicate the very high value of swing velocity.

Thus low levels of centrifugal force produced by low velocity swings will be sufficient to cause the wheel to turn counterclockwise, for at these low force levels the wheel is subjected to low levels of spring tension and its movement is not substantially resisted. Higher levels of centrifugal force, reflecting higher value of swing velocity, encounter progressively greater levels of spring tension which slow down wheel movement prevent the pointer from going off scale.

While there has been shown and described a preferred embodiment of a velocity meter for sports implements in accordance with the invention, it will be appreciated that many changes and modifications may be made therein without, however, departing from the essential spirit thereof.

Thus instead of a simple helical spring, a complex spring may be provided to establish a linear relationship between the applied centrifugal force and spring tension. However, as noted previously, it is not necessary that pointer movement be proportional to swing velocity, but only that an increase in swing velocity results in a perceptible change in pointer position indicative of this change. Also, instead of attaching the meter to a swingable implement, it may be strapped to the wrist or hand of a player to indicate the velocity at which he swings his arm in an exercise program or it may be attached to the foot of the player to indicate kick velocity.

We claim:

1. A velocity meter attachable to a hand-held swingable sports implement to indicate swing velocity, said meter comprising:
    (a) a toothed ratchet wheel mounted for rotation about its center and having a pointer on its upper face to indicate the angular position of the wheel, said wheel rotating within a plane divided into four quadrants whose center is coincident with the wheel center, said four quadrants being composed of upper left and right quadrants and lower left and right quadrants;
    (b) an inertia weight attached to the underface of the wheel at an eccentric position thereon, in which at a starting position, the weight lies in the lower right quadrant;
    (c) a helical spring joining a point on the weight to a fixed point below the lower right quadrant, said spring at the starting position of the wheel being aligned with a radial axis running from the wheel center through the weight point and the fixed point, the distance then existing between the weight point and the fixed point being such that the spring is under minimum tension, whereby when the implement is swung; the resultant centrifugal force causes the wheel to turn counterclockwise and in the course of this motion the weight point, depending on the strength of this force, travels from the lower right quadrant to the upper right quadrant and from there to the upper left quadrant, the spring when the weight point lies in the lower right quadrant undergoing no substantial increase in tension, but when the weight point lies in the upper left and upper right quadrants, the spring is then stretched to produce a significant increase in tension, the wheel being arrested at a position indicative of swing velocity; and
    (d) a retractable pawl engaging the teeth of the wheel to permit counterclockwise motion thereof and to prevent clockwise motion, the meter being reset when the pawl is retracted.

2. A meter as set forth in claim 1, wherein said weight point is a pin depending from the underface of the weight.

3. A meter as set forth in claim 1, wherein said wheel is mounted within a case having a cover, said cover having a window to expose said pointer.

4. A meter as set forth in claim 3, wherein said window has an arcuate form and is provided at its upper edge with swing velocity indicia.

5. A meter as set forth in claim 3, wherein said case is rectangular and said fixed point is a pin anchored at the lower right corner of the case.

6. A meter as set forth in claim 1, wherein said pawl is formed of flat spring metal and is provided with a release bar which when depressed retracted the pawl.

7. A meter as set forth in claim 1 provided with strap means to attach the meter to a baseball bat.

8. A meter as set forth in claim 3, wherein said wheel is mounted on an axle, one end of which is journaled in a hole in said case and the other end in a hole in the cover.

* * * * *